H. N. CARPENTER.
TRACTION PLOW.
APPLICATION FILED MAR. 20, 1914.
1,123,991.
Patented Jan. 5, 1915.
2 SHEETS—SHEET 2.
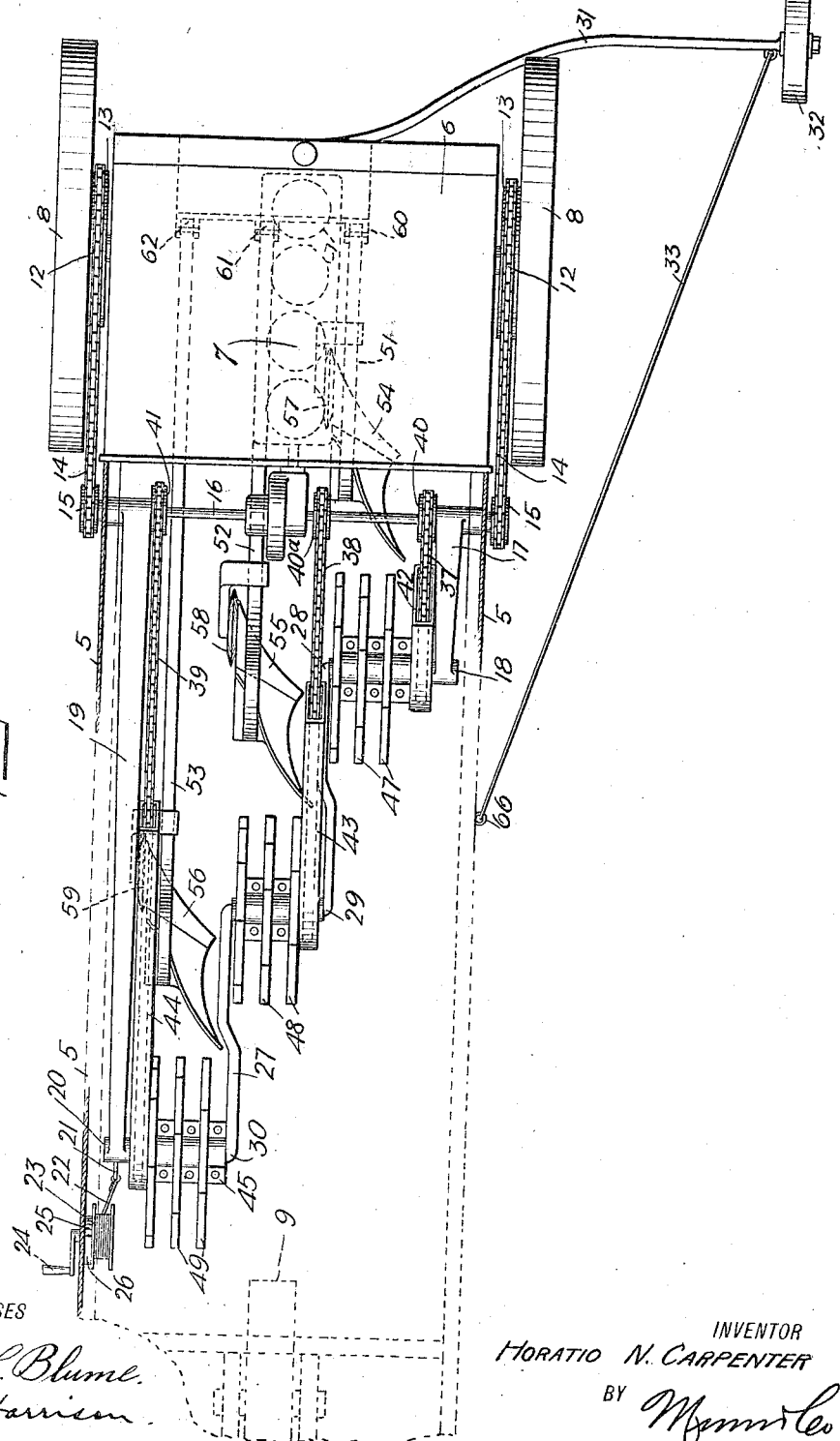
WITNESSES
George L. Blume
Walton Harrison
INVENTOR
HORATIO N. CARPENTER
BY
ATTORNEYS

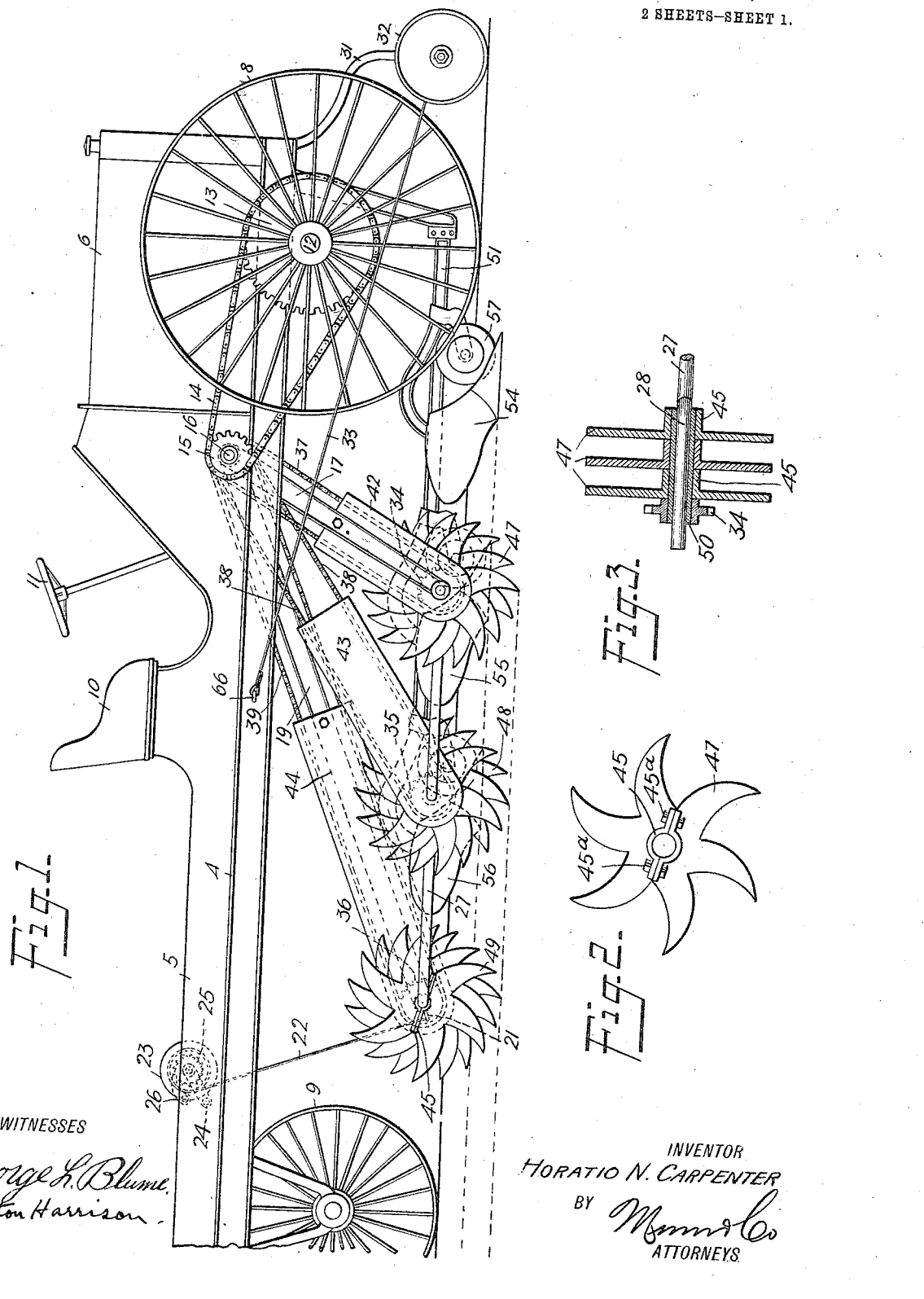

UNITED STATES PATENT OFFICE.

HORATIO NEWTON CARPENTER, OF DE WITT, MICHIGAN.

TRACTION-PLOW.

1,123,991.  Specification of Letters Patent.  Patented Jan. 5, 1915.

Application filed March 20, 1914. Serial No. 826,041.

*To all whom it may concern:*

Be it known that I, HORATIO N. CARPENTER, a citizen of the United States, residing at De Witt, in the county of Clinton and State of Michigan, have invented certain new and useful Improvements in Traction-Plows, of which the following is a specification.

My invention relates to traction plows, and more particularly to devices of this kind used for deep plowing, with such system as to loosen the subsoil, preferably without bringing much if any of the latter to the surface, and in such manner as to cause the subsoil to absorb considerable quantities of water.

More particularly stated, I seek to produce a traction plow, in which a number of rotary cutters extend deeply into the ground and are rotated positively by power driven gearing employed for the purpose, so that the cutters stir the ground to a considerable depth, but without elevating the subsoil to a substantially higher plane than that in which it is located before the plow begins work.

The conservation of moisture is quite a material factor in the successful raising of crops, especially in regions where the rainfall is far from uniform in different seasons of the year. It frequently happens that the total annual rainfall is adequate for the purpose of raising crops, but that at one season there is too much rain and at another there is not enough, so that the crops are supplied at one time with too much moisture and at another time are subjected to drought. If the farming lands can be rendered sufficiently porous for a considerable distance down below the surface, they can be caused to absorb vast quantities of water, so as to take up the excess thereof when the rainfall is abnormally great, and having thus absorbed such excess of water, they give it up gradually during a drought. The crops can thus be supplied with moisture, the quantity of which is at all times suitable for their needs.

By my invention I seek to so plow the ground as to maintain, as nearly as practicable, the conditions just described. To this end I provide a number of rotary cutters, so proportioned and arranged as to extend to considerable depth in the ground, these cutters being of such form as to stir the subsoil without lifting the latter any more than is necessary. It is not desirable that the subsoil be brought to the surface, as the richness it contains is less than that of the top soil, and in elevating the subsoil the top soil is to some extent essentially buried.

Reference is made to the accompanying drawings forming a part of this specification, and in which like letters indicate like parts.

Figure 1 is a fragmentary side elevation of my improved traction plow. Fig. 2 is a detail view, showing in side elevation one of the rotary cutters, and parts immediately associated therewith. Fig. 3 is a detail view, showing in central section a cluster or group of these cutters, acting substantially as a unit. Fig. 4 is a top view partly in plan and partly broken away showing the machine.

A tractor frame is shown at 4, and carries a vehicle body 5 and a motor casing 6. Housed within this casing is a motor 7, in this instance an internal combustion engine. Supporting the front end of the tractor frame 4, and driven by the motor 7, are a pair of traction wheels 8. The rear end of the tractor frame 4 rests upon a ground wheel 9. The operator's seat is shown at 10, and adjacent this seat is a steering wheel 11, these parts being of the usual or any desired construction. The traction wheels 8 are mounted rigidly upon the ends of a revoluble shaft 12. Mounted rigidly upon this shaft are two sprocket wheels 13, and engaging the latter are two sprocket chains 14, the latter also engaging two sprocket wheels 15. These two sprocket wheels are mounted rigidly upon the ends of a revoluble shaft 16 which is journaled in the vehicle body 5 and extends entirely through the same.

Mounted loosely upon the shaft 16 is an arm 17, which extends obliquely downward from the shaft, and carries at its lower end a bearing 18. Another arm 19 is mounted loosely upon the shaft 16, and extends rearwardly therefrom to a considerable distance, as this arm is considerably longer than the arm 17. The arm 19 carries a bearing 20 and also an eye 21. Secured to the eye 21 is a cable 22, which is partially wound upon a drum 23, this drum being provided with a handle 24 whereby it may be turned. The drum 23 is further provided with a ratchet wheel 25, and engaging the latter is a pawl 26. The operator by turning the handle 24 causes the cable 22 to be wound upon the drum 23, and by lifting the pawl 26 free of the ratchet wheel 25, the cable 22 may be paid out from the drum.

A frame 27 having generally a zig-zag form, engages the bearings 18 and 20, so as to be supported thereby. The frame 27 is provided with a number of laterally extending portions 28, 29, 30, disposed parallel with each other, and serving essentially the purpose of journal necks.

A caster bar 31 carries a caster wheel 32, and extending from the caster bar 31 is a guy 33 which is connected with an eye 66 on the vehicle body 5.

Supported by the laterally extending portions 28, 29, 30 of the frame 27, are sprocket wheels 34, 35, 36, and engaging these sprocket wheels are sprocket chains 37, 38, 39. These sprocket chains also engage three other sprockets 40, 40ª, 41, which are mounted upon the shaft 16 and rigid relatively to the latter. The sprocket wheels 34, 35, 36 are mounted in guides 42, 43, 44, having severally the form of flattened tubes, and which partially inclose the sprocket chains 37, 38, 39.

Three groups or clusters of revoluble cutters are shown at 47, 48, 49, each of these cutters being made in two parts, and held together by a two-part collar 45, each collar being provided with bolts 45ª. Each group of cutters is mounted upon a sleeve 50, the sprocket wheels 34, 35 and 36, each being associated with a group of cutters, and mounted therewith upon the revoluble sleeve 50, as may be understood from Fig. 3.

A number of plow beams are shown at 51, 52, 53, each carrying its individual plow 54, 55, 56, and its individual colter 57, 58, 59. The plow beams 51, 52, 53 are mounted upon pivot pins 60, 61, 62, and are adapted to swing in vertical planes.

The frame 27, with its three groups of cutters 47, 48, 49 and parts immediately associated therewith, is self-adjustable relatively to the ground, in the sense that the front end of the frame swings upon the arm 17, the rear end of the frame swinging also upon the arm 19. The operator by turning the handle 24 and winding up the cable 22 to any desired extent, can regulate the depth to which the cutters may extend into the earth. The operator by winding the drum 23 can also lift the cutters entirely out of engagement with the ground. The plows 54, 55, 56, being severally in front of the respective groups of cutters 47, 48, 49, loosen the top soil immediately in front of these cutters, so that the cutters may more readily penetrate into the earth. As the cutters are rotated positively by the sprocket gearing, the latter being in turn driven positively by the rotation of the traction wheels 8, the ground is cut and stirred to a considerable depth, and thereby rendered porous and full of holes and voids, occupying locations considerably below the top surface of the soil.

The operation of my device is as follows: The various parts being assembled and arranged as described, and power being applied to the traction wheels 8 by action of the motor 7, the machine travels ahead over the ground to be plowed. The frame 27 being adjusted as above described, so that the cutters penetrate to the desired extent into the ground, and the plows 54, 55, 56 being in action from the general forward movement of the machine, the top soil is effectively plowed, and the subsoil is stirred to a considerable depth but without being raised to the surface.

I do not limit myself to the precise construction shown, as variations may be made therein without departing from the spirit of my invention.

Having thus described my invention, what I claim as new and desire to secure by Letters Patent is as follows:

1. In a device of the character described, the combination of a vehicle body, a frame disposed adjacent said vehicle body and having a general zig-zag form, said frame being provided with portions serving as journal necks, sleeves revolubly mounted upon said portions, a plurality of revoluble cutters carried by each of said sleeves, a sprocket wheel also carried by each of said sleeves, sprocket chains severally engaging the respective sprocket wheels, and means for driving said sprocket chains.

2. A device of the character described comprising a vehicle body, a revoluble shaft carried thereby and journaled thereupon, a pair of arms loosely mounted upon said shaft and extending rearwardly and downwardly therefrom, one of said arms being longer than the other, a frame made in a single piece and having generally a zig-zag form, said frame at one of its ends being journaled to one of said arms, and at its other end being journaled to the other of said arms, a plurality of revoluble cutters journaled upon said frame and arranged in groups, one group being located nearer than another to a particular end of said vehicle body, said groups being arranged in different vertical planes and thus staggered relatively to said vehicle body, a plurality of revoluble sleeves each carrying one of said groups of cutters, and mechanism connected with said cutters for actuating the same, said mechanism being also connected with said revoluble shaft and actuated thereby.

3. A traction plow comprising a vehicle body, wheels for engaging the ground and supporting said body, gearing connected with said wheels and actuated by move ments thereof, said gearing including a revoluble shaft, a frame carried by said vehicle body and provided with a plurality of laterally extending portions serving as journal necks, a number of removable cutters mounted upon said journal necks and adapted to turn thereupon, and a plurality of separate transmission devices connected respectively with said removable cutters and also connected with said revoluble shaft in order to transmit power from said revoluble shaft to said removable cutter.

4. A device of the character described comprising a vehicle body, wheels supporting said body and engaging the ground, sprocket gearing in operative relation to said wheels, a revoluble shaft connected with said sprocket gearing and driven thereby, a plurality of sprocket wheels mounted upon said revoluble shaft, a single frame of zig-zag form located below said vehicle body and extending obliquely across the same, said frame being provided with a plurality of laterally extending portions serving as journal necks, sleeves revolubly mounted upon said journal neck, a plurality of revoluble cutters carried by said sleeves, each sleeve carrying a group of said cutters, sprocket wheels mounted rigidly upon said sleeves for turning the same, and sprocket chains engaging said sprocket wheels and extending therefrom to said sprocket wheels carried by said revoluble shaft.

5. A device of the character described comprising a vehicle body, a frame disposed adjacent to said vehicle body and having a general zig-zag form, said frame extending rearwardly and laterally across said vehicle body and being provided with portions serving as journal necks, said portions extending at right angles to the general direction in which the vehicle body extends, sleeves revolubly mounted upon said portions serving as journal necks, revoluble cutters carried by said sleeves, and mechanism for turning said sleeves in order to cause said cutters to stir the soil.

In testimony whereof I have signed my name to this specification in the presence of two subscribing witnesses.

HORATIO NEWTON CARPENTER.

Witnesses:
 MARION TIFFT,
 FRANK HUBBARD.

Copies of this patent may be obtained for five cents each, by addressing the "Commissioner of Patents, Washington, D. C."